US008160996B2

(12) United States Patent
Lo et al.

(10) Patent No.: US 8,160,996 B2
(45) Date of Patent: Apr. 17, 2012

(54) SEQUENCE ONLINE ANALYTICAL PROCESSING SYSTEM

(75) Inventors: Eric Chi Lik Lo, Kowloon (HK); Benjamin Chi Ming Kao, Hong Kong (HK); Wai-Shing Ho, Hong Kong (HK); Chun-Kit Chui, Kowloon (HK); Sau-Dan Lee, Hong Kong (HK)

(73) Assignees: The Hong Kong Polytechnic University, Kowloon (HK); Versitech Limited, Pokfulam (HK)

( * ) Notice: Subject to any disclaimer, the term of this patent is extended or adjusted under 35 U.S.C. 154(b) by 435 days.

(21) Appl. No.: 12/364,265

(22) Filed: Feb. 2, 2009

(65) Prior Publication Data

US 2010/0198777 A1 Aug. 5, 2010

(51) Int. Cl.
*G06F 17/30* (2006.01)
*G06F 17/00* (2006.01)

(52) U.S. Cl. ........ 707/600; 707/601; 707/602; 707/603; 707/604

(58) Field of Classification Search .......... 707/600–604; 705/10
See application file for complete search history.

(56) References Cited

U.S. PATENT DOCUMENTS 5,799,300 A * 8/1998 Agrawal et al. ................. 1/1
7,010,495 B1 * 3/2006 Samra et al. ............... 705/14.41
7,516,128 B2 * 4/2009 Colby et al. .................... 1/1

OTHER PUBLICATIONS

Smart Card Alliance, "Contactless payment and the retail point of sale: Applications, technologies and transaction models," Mar. 2003, Publication No. PT-03002, pp. 1-50.
Beyer, K. S. and R. Ramakrishnan, "Bottom-up computation of sparse and iceberg cubes," *SIGMOD*, 1999, pp. 359-370.
Chen Y. et al., "Multi-dimensional regression analysis of time-series data streams," Proceedings of the 28th VLDB Conference, Hong Kong, China, 2002, pp. 323-334.
Fang, M., et al., "Computing iceberg queries efficiently," Proceedings of the 24th VLDB Conference, New York, USA, 1998, pp. 299-310.
Finkenzeller, K., "RFID Handbook: Fundamental and Applications in Contactless Smart Cards and Identification," p. 13, Wiley, 2003.
Gonzalez, H., et al., "FlowCube: Constructing RFID FlowCubes for Multi-Dimensional Analysis of Commodity Flows," VLDB, Sep. 12-15, 2006, pp. 834-845.
Gonzalez, H., et al., "Warehousing and Analyzing Massive RFID Data Sets," Proceedings of the 22nd ICDE, 2006, p. 83.
Gray, J. et al., "Data cube: A relational aggregation operator generalizing group-by, cross-tab, and sub-totals," Data Mining and Knowledge Discovery 1, 1997, pp. 29-53.

(Continued)

*Primary Examiner* — Yicun Wu
(74) *Attorney, Agent, or Firm* — Muncy, Geissler, Olds & Lowe, PLLC

(57) ABSTRACT

A sequence online analytical processing (S-OLAP) system 50 for analysing an event database (41) storing events (12), the system (50) comprising: an S-OLAP engine (53) to compute an S-cuboid (49) for a query on the event database (41); a sequence query engine (54) to form part of the S-cuboid (49) by performing the steps of: selection, clustering, sequence formation and sequence grouping; a cuboid repository (52) to store computed S-cuboids (49) and to be searched by the S-OLAP engine (53) for an S-cuboid query to determine whether an S-cuboid has previously been computed; and a sequence cache (56) to cache constructed sequence groups.

19 Claims, 16 Drawing Sheets

OTHER PUBLICATIONS

Gupta, A., et al., "Materialized views: Techniques, Iimplementations, and Applications," MIT Press, 1999.

Hellerstein, J. M. et al., "Online aggregation," SIGMOD 1997, pp. 171-182.

Kohavi, R. et al., "KDD-Cup 2000 organizers' report: Peeling the onion," SIGKDD Explorations, vol. 2(2):86-98, 2000.

Lenz, H.J., et al., "Summarizability in OLAP and Statistical Data Bases," SSDBM, 1997.

Li, X., et al., "High-Dimensional OLAP: A Minimal Cubing Approach," Proceedings of the $30^{th}$ VLDB, pp. 528-539, 2004.

Lo, E., et al., "OLAP on Sequence Data," Technical report, available at www.comp.polyu.edu.hk/~cscllo/solap.pdf, 2008.

O'Neil, P. E., et al., "Multi-table joins through bitmapped join indices," SIGMOD Record, 24(3):8-11, 1995.

Ramakrishnan, R., et al., "SRQL: Sorted Relational Query Language," Proceedings of SSDBM, Jul. 1-3, pp. 84-95, 1998.

Ross, K. A., et al., "Fast computation of sparse datacubes," Proceedings of the $23^{rd}$ VLDB, pp. 116-125, 1997.

Sadri, R., et al., "Optimization of sequence queries in database systems," PODS, pp. 71-81, 2001.

Seshadri, P., et al., "Sequence query processing," SIGMOD, pp. 430-441, 1994.

Seshadri, P., et al., "The design and implementation of a sequence database system," Proceedings of the $22^{nd}$ VLDB, pp. 99-110, 1996.

Valduriez, P., "Join indices," ACM Transactions on Database Systems, vol. 12(2): pp. 218-246, 1987.

Wiwatwattana, N., et al., "X3: A Cube Operator for XML OLAP," ICDE, pp. 916-925, 2007.

* cited by examiner

Figure 2

| (X, Y, Y, X) | COUNT |
|---|---|
| (Clarendon,Pentagon,Pentagon,Clarendon) | 5,432 |
| (Clarendon,Wheaton,Wheaton,Clarendon) | 7,654 |
| ... | ... |
| (Pentagon,Glenmont,Glenmont,Pentagon) | 4,321 |
| (Pentagon,Wheaton,Wheaton,Pentagon) | 200,125 |
| ... | ... |
| (Wheaton,Pentagon,Pentagon,Wheaton) | 6,543 |

Figure 3

1. SELECT    COUNT(*)
2. FROM      Event
3. WHERE     time >== 2007-10-01T00:00 AND
4.           time < 2007-12-31T24:00
5. CLUSTER BY card-id AT individual,
6.           time AT day
7. SEQUENCE BY time ASCENDING
8. SEQUENCE GROUP BY card-id AT fare-group,
9.           time AT day
10. CUBOID BY SUBSTRING(X, Y, Y, X) WITH
11.          X AS location AT station,
12.          Y AS location AT station
13.          LEFT-MAXIMALITY (x1, y1, y2, x2) WITH
14.          x1.action = "in" AND
15.          y1.action = "out" AND
16.          y2.action = "in" AND
17.          x2.action = "out"

Figure 5

10. CUBOID BY SUBSTRING(X, Y, Y, X, X, Z) WITH
11. X AS *location* AT station,
12. Y AS *location* AT station,
13. Z AS *location* AT station
14. LEFT-MAXIMALITY($x1, y1, y2, x2, x3, z1$) WITH
15. $x1$.action = "in" AND $x1$.location = "Pentagon" AND
16. $y1$.action = "out" AND $y1$.location= "Wheaton" AND
17. $y2$.action = "in" AND $y2$.location = "Wheaton" AND
18. $x2$.action = "out" AND $x2$.location = "Pentagon" AND
19. $x3$.action = "in" AND $x3$.location = "Pentagon" AND
20. $z1$.action = "out"

Figure 7

Algorithm COUNTERBASED
Input: (a) A set of sequences $S$ from a sequence group; (b) A pattern template $T$=SUBSTRING$(Y_1, \ldots, Y_m)$ with $m$ pattern symbols and $n$ pattern dimensions $P_1, \ldots, P_n$ ($n \leq m$); (c) a cell restriction $\sigma$; and (d) a matching predicate $\rho$.
Output: An array $C$ of $n$ dimensions 1. Let $dom(P_i)$ be the domain of pattern dimension $P_i$ at the specified abstraction level
2. / Initialize the counters /
3. for each pattern $(v_1, \ldots, v_n)$, where $v_i \in dom(P_i)$
4.     Set entry $C[v_1, v_2, \ldots, v_n] = 0$
5. / Do the grouping and counting /
6. for each sequence $s$ in $S$
7.     for each unique substring $t$ of $s$ in the form of $\langle y_1, \ldots, y_m \rangle$, where each $y_i \in dom(P_i)$, $t$ matches an instantiation of $T$ and $t$ satisfies $\rho$ and $\sigma$
8.         $C[y_1, \ldots, y_m]$++
9. return $C$

Figure 8

| sid | card-id | event-sequence (only the station values are shown for brevity) |
|---|---|---|
| s1 | 688 | ⟨Glenmont,Pentagon,Pentagon,Wheaton,Wheaton,Wheaton,Pentagon⟩ |
| s2 | 23456 | ⟨Pentagon,Wheaton,Wheaton,Pentagon⟩ |
| s3 | 1012 | ⟨Clarendon,Pentagon⟩ |
| s4 | 77 | ⟨Wheaton,Clarendon,Deanwood,Wheaton⟩ |

N.B. Events at odd positions have action "in"
whereas events at even positions have action "out"

Figure 9

Algorithm BUILDINDEX

Input: (a) A set of sequences $S$ from a sequence group; (b) A pattern template $T=\text{SUBSTRING}(Y_1, \ldots, Y_m)$ with $m$ pattern symbols and $n$ pattern dimensions $P_1, \ldots, P_n$ ($n \leq m$);

Output: An array $L_m$, which is an $m$-dimensional array and each array entry contains a list of sequence $sid$s.

1. Let $dom(P_i)$ be the domain of pattern dimension $P_i$ at the specified abstraction level
2. /* Scan the sequence group $S$ */
3. for each sequence $s$ in $S$
4.     for each unique substring $t$ of $s$ in the form of $\langle y_1, \ldots, y_m \rangle$, where each $y_j \in dom(P_j)$ and $t$ matches an instantiation of $T$
5.         add $sid$ of $s$ into $L_m[y_1, \ldots, y_m]$
6. return $L_m^T$

Figure 10

$l_1$: $L_2[\text{Clarendon,Deanwood}] = \{s4\}$
$l_2$: $L_2[\text{Clarendon,Pentagon}] = \{s3\}$
$l_3$: $L_2[\text{Deanwood,Wheaton}] = \{s4\}$
$l_4$: $L_2[\text{Glenmont,Pentagon}] = \{s1\}$
$l_5$: $L_2[\text{Pentagon,Pentagon}] = \{s1\}$
$l_6$: $L_2[\text{Pentagon,Wheaton}] = \{s1, s2\}$
$l_7$: $L_2[\text{Wheaton,Clarendon}] = \{s4\}$
$l_8$: $L_2[\text{Wheaton,Pentagon}] = \{s1, s2\}$
$l_9$: $L_2[\text{Wheaton,Wheaton}] = \{s1, s2\}$ $L_2$ $L_1[\text{Clarendon}] = \{s3, s4\}$
$L_1[\text{Deanwood}] = \{s4\}$
$L_1[\text{Glenmont}] = \{s1\}$
$L_1[\text{Pentagon}] = \{s1, s2, s3\}$
$L_1[\text{Wheaton}] = \{s1, s2, s4\}$ $L_1$

Figure 11

10. CUBOID BY
11. SUBSTRING $(X, Y)$ WITH
12. $X$ AS *location* AT station,
13. $Y$ AS *location* AT station
14. LEFT-MAXIMALITY $(x1, y1)$ WITH
15. $x1.action =$ "in" AND
    $y1.action =$ "out"

Figure 12

| (station,station) | count |
|---|---|
| (Clarendon,Pentagon) | 1 |
| (Deanwood,Wheaton) | 1 |
| (Glenmont,Pentagon) | 1 |
| (Pentagon,Wheaton) | 2 |
| (Wheaton,Clarendon) | 1 |
| (Wheaton,Pentagon) | 2 |

Figure 13

| | | list-intersection | sid-intersection | {sid} |
|---|---|---|---|---|
| $l_{10}$: | $L_3^{(X,Y,Y)}$ [Clarendon,Pentagon,Pentagon] | $l_2 \cap l_5$ | $\{s3\} \cap \{s1\}$ | $\{\}$ |
| $l_{11}$: | $L_3^{(X,Y,Y)}$ [Glenmont,Pentagon,Pentagon] | $l_4 \cap l_5$ | $\{s1\} \cap \{s1\}$ | $\{s1\}$ |
| $l_{12}$: | $L_3^{(X,Y,Y)}$ [Pentagon,Pentagon,Pentagon] | $l_5 \cap l_5$ | $\{s1\} \cap \{s1\}$ | $\{s1\}$ |
| $l_{13}$: | $L_3^{(X,Y,Y)}$ [Wheaton,Pentagon,Pentagon] | $l_8 \cap l_5$ | $\{s1, s2\} \cap \{s1\}$ | $\{s1\}$ |
| $l_{14}$: | $L_3^{(X,Y,Y)}$ [Deanwood,Wheaton,Wheaton] | $l_3 \cap l_9$ | $\{s4\} \cap \{s1, s2\}$ | $\{\}$ |
| $l_{15}$: | $L_3^{(X,Y,Y)}$ [Pentagon,Wheaton,Wheaton] | $l_6 \cap l_9$ | $\{s1, s2\} \cap \{s1, s2\}$ | $\{s1, s2\}$ |

Figure 14

| | list-intersection | sid-intersection | {sid} |
|---|---|---|---|
| $l_{16}$: $L_4^{(X,Y,Y,X)}$[Pentagon,Wheaton,Wheaton,Pentagon] | $l_{15} \cap l_8$ | {s1, s2} ∩ {s1, s2} | {s1, s2} |

Algorithm QUERYINDICES

Input: (a) A set of sequences $S$ from a sequence group; (b) A pattern template $T$=SUBSTRING$(Y_1, \ldots, Y_m)$ with $m$ pattern symbols and $n$ pattern dimensions $P_1, \ldots, P_n$ ($n \leq m$); (c) a cell restriction $\sigma$; and (d) a matching predicate $\rho$.

Output: An array $C$ of $n$ dimensions

1. Let $dom(P_i)$ be the domain of pattern dimension $P_i$ at the specified abstraction level
2. / Initialize the counters /
3. for each pattern $(v_1, \ldots, v_n)$, where $v_i \in dom(P_i)$
4.     Set entry $C[v_1, v_2, \ldots, v_n] = 0$
5. / Look-up inverted index $L_m^{(Y_1, \ldots, Y_m)}$ and join the inverted indices if necessary /
6. while $L_m^{(Y_1, \ldots, Y_m)}$ is not available
7.     / Join the indices according to the pattern template and intersect the sequence lists /
8.     $L_{i+1}^{(Y_1, \ldots, Y_{i+1})} = L_i^{(Y_1, \ldots, Y_i)} \bowtie L_2^{(Y_i, Y_{i+1})}$ (where $L_i^{(Y_1, \ldots, Y_i)}$ is the largest available inverted index)
9.     Scan the database to eliminate invalid entries and cache $L_{i+1}^{(Y_1, \ldots, Y_{i+1})}$
10. for each entry $L_m^{(Y_1, \ldots, Y_m)}[v_1, \ldots, v_m]$ in $L_m^{(Y_1, \ldots, Y_m)}$
11.     $C[v_1, \ldots, v_n]$ equals to the number of sequences in $L_m^{(Y_1, \ldots, Y_m)}[v_1, \ldots, v_m]$ that satisfy $\sigma$ and $\rho$.
12. return $C$

SEQUENCE ONLINE ANALYTICAL PROCESSING SYSTEM

TECHNICAL FIELD

The invention concerns a sequence online analytical processing system and a method for building a sequence cuboid.

BACKGROUND OF THE INVENTION

Traditional online analytical processing (OLAP) systems process records in a fact table and summarize their key statistics with respect to certain measure attributes. A user can select a set of dimension attributes and their corresponding levels of abstraction and an OLAP system will partition the data records based on those dimension attributes and abstraction levels. Records that share the same values in those dimension attributes (with respect to the selected abstraction levels) are grouped together. Aggregate functions (such as sum, average, count) are then applied to the measure attributes of the records in each group. Next, an OLAP system reports a summary (referred to as a cuboid) by tabulating the aggregate values for all possible groups. OLAP is a powerful data analysis tool because it allows users to navigate or explore different levels of summarization by interactively changing the set of dimension attributes and their abstraction levels. In other words, users can navigate from one cuboid to another interactively in order to obtain the most interesting statistics through a set of pre-defined OLAP operations, for example, roll-up, drill-down, slice, and dice.

Although powerful existing OLAP systems only handle independent records, many kinds of real-life data exhibit logical ordering among their data items and are thus sequential in nature. Examples of sequence data include stock market data, web server access logs and RFID logs such as those generated by a commodity tracking system in a supply chain. Similar to conventional data, there is a strong demand to warehouse and to analyze the vast amount of sequence data in a user-friendly and efficient way. However, traditional online analytical processing (OLAP) systems and techniques are not designed for sequence data and they are incapable of supporting sequence data analysis.

Sequence databases and OLAP do not address the issues of sequence data analysis as well. OLAP on unconventional data does not address the problem of pattern based grouping and analysis.

SUMMARY OF THE INVENTION

In a first preferred aspect, there is provided a sequence online analytical processing (S-OLAP) system for analysing an event database storing events, each event consisting of at least one dimension and measure; the system comprising:
a sequence cuboid (S-cuboid) builder to build an S-cuboid, the S-cuboid defining a logical view of the sequence data at a predetermined degree of summarization;
wherein the S-cuboid built by the S-cuboid builder is specified by:
a WHERE clause to select events of interest;
a CLUSTER BY clause to specify events that are elements of a sequence to be clustered together;
a SEQUENCE BY clause to form a sequence from a cluster of events;
a SEQUENCE GROUP BY clause to group sequences whose events share the same dimension values and form a sequence group;
a CUBOID BY clause to specify the logical view of the sequence data; and
at least one aggregation function to be applied to the sequences in each S-cuboid cell.

Each attribute in the CLUSTER BY clause may be associated with an abstraction level in a concept hierarchy.

The CUBOID BY clause may comprise:
a pattern template to define a format of the substring/subsequence patterns to be matched against the data sequences;
a cell restriction to define how a response when a data sequence contains multiple occurrences of a cell's pattern and the content of the data sequence should be assigned to the cell; and
a matching predicate to select data sequences of interest.

The pattern template may consist of a sequence of symbols each associated with a domain of values, and the domain of values is specified as the domain of an attribute at predetermined abstraction level.

The pattern template may instantiate a pattern by a set of values that are associated with the symbols, and each cell is associated with a pattern.

The cell restriction may be specified by a keyword.

The matching predicate may be specified by introducing a sequence of event placeholders after the cell restriction.

The system may further comprise six S-OLAP operations:
APPEND to add a pattern symbol to the end of a pattern template,
PREPEND to add a pattern symbol to the front of a pattern template,
DE-TAIL to remove the last pattern symbol from a pattern template,
DE-HEAD to remove the first pattern symbol from a pattern template,
PATTERN-ROLLUP (P-ROLL-UP) to modify the abstraction level of pattern dimensions by moving the abstraction level of a pattern dimension one level up the concept hierarchy; and
PATTERN-DRILL-DOWN (P-DRILL-DOWN) the abstraction level of pattern dimensions by moving the abstraction level of a pattern dimension one level down the concept hierarchy.

The events may form a sequence if there is a logical ordering among a set of events.

A set of S-cuboids may form a lattice (S-cube) and an S-cuboid at a coarser granularity is at a higher level in the lattice containing fewer global and/or pattern dimensions or the dimensions are at a higher level of abstraction.

The S-cuboid may be computed by associating each cell in an S-cuboid with a counter and for each sequence, the cells whose associated patterns are contained in the sequence are determined and their corresponding counter is incremented by one The S-cuboid may be computed by creating a set of inverted indices by pre-processing the data offline, and the precomputed inverted indices are used to dynamically assemble and compute the cells of the S-cuboid.

In a second aspect, there is provided a method for building a sequence cuboid (S-cuboid) for a database query of an event database, the method comprising:
selecting events from the event database;
clustering the selected events;
forming sequences from the clustered events; and
grouping the sequences into sequence groups sequences whose events share the same dimensions' values.

The method may further comprise grouping patterns to specify a logical view of results from the database query according to a user defined pattern template, cell restriction and a matching predicate.

The method may further comprise aggregating the results of the database query according to a selected aggregation function.

The method may further comprise returning an n-dimensional array where n is the number of pattern dimensions.

In a third aspect, there is provided a sequence online analytical processing (S-OLAP) system for analysing an event database storing events, the system comprising:

an S-OLAP engine to compute an S-cuboid for a query on the event database; and a sequence query engine to form part of the S-cuboid by performing the steps of: selection, clustering, sequence formation and sequence grouping.

The system may further comprise a cuboid repository to store computed S-cuboids and to be searched by the S-OLAP engine for an S-cuboid query to determine whether an S-cuboid has previously been computed.

The system may further comprise a sequence cache to cache constructed sequence groups.

The system may further comprise auxiliary data structures to compute the query online.

The system may further comprise a user interface to assist a user in specifying an S-cuboid.

A notable difference between S-OLAP from traditional OLAP is that a sequence is characterized by the attributes' values of its constituting items and by the subsequence/substring patterns it possesses. The S-OLAP system is able to support pattern-based grouping and aggregation which are not supported by any OLAP system.

S-OLAP allows users to interactively explore different levels of summarization of sequence data through a user-friendly interface. This facilitates the managerial decision process in certain applications.

BRIEF DESCRIPTION OF THE DRAWINGS

An example of the invention will now be described with reference to the accompanying drawings, in which:

FIG. 2 is a sequence OLAP query result;

FIG. 3 is an S-cuboid specification $Q_1$;

FIG. 5 is an S-cuboid specification $Q_2$;

FIG. 7 is pseudocode for a CounterBased procedure;

FIG. 8 is an example sequence group in Query $Q_2$ (day="2006-12-25", fare-group="regular");

FIG. 9 is pseudocode for a BuildIndex procedure;

FIG. 10 depicts inverted indices of a sequence group;

FIG. 11 is query specification $Q_3$;

FIG. 12 is a two dimensional S-cuboid for query $Q_3$;

FIG. 13 depicts an inverted index $L_3^{(X,Y,Y)}$;

FIG. 14 depicts an inverted index $L_4^{(X,Y,Y,X)}$;

FIG. 15 is pseudocode for a QueryIndices procedure; and

DETAILED DESCRIPTION OF THE DRAWINGS

Figure 1:
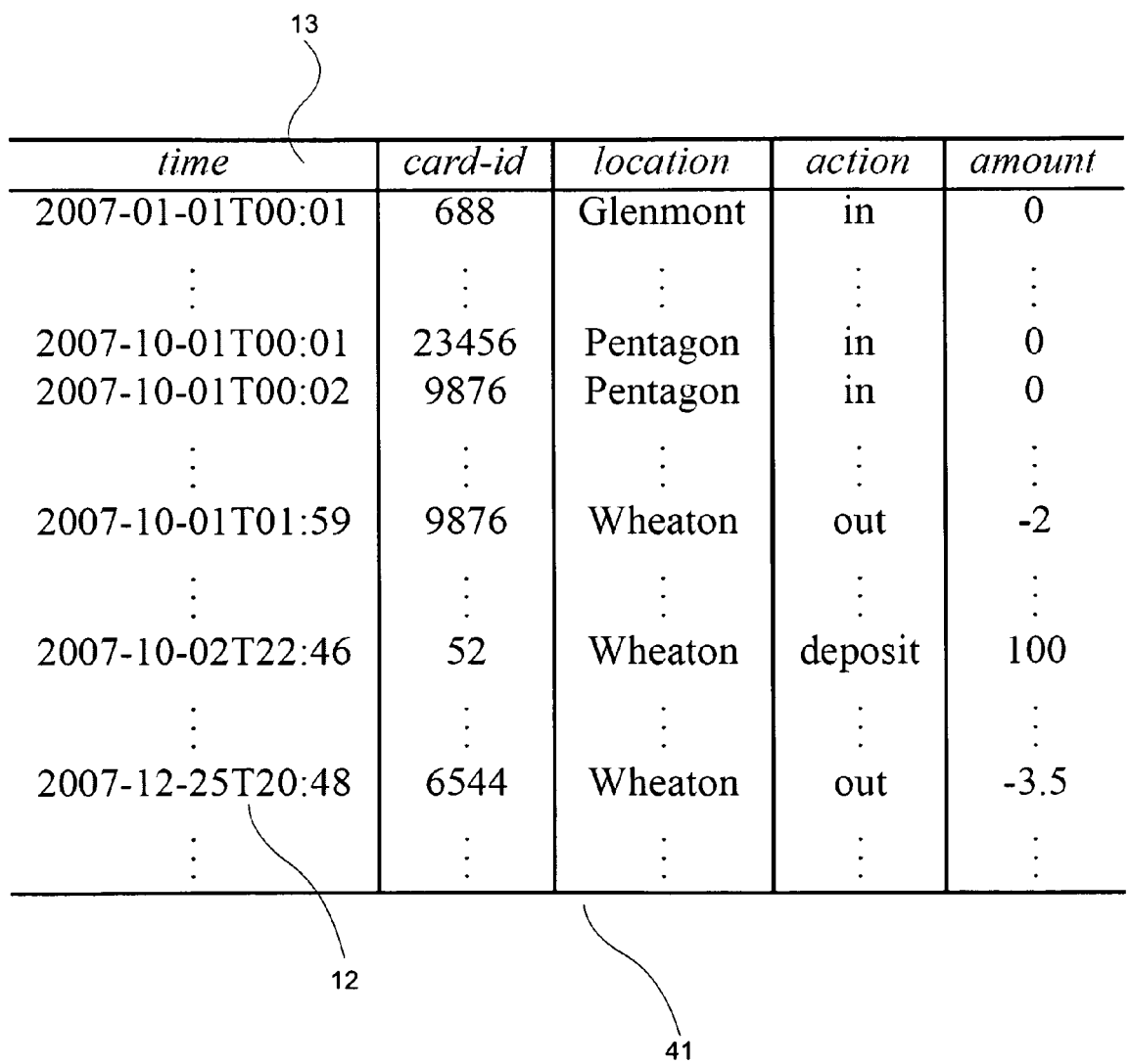
FIG. 1 is an event database.

FIG. 1 and the following discussion are intended to provide a brief, general description of a suitable computing environment in which the present invention may be implemented. Although not required, the invention will be described in the general context of computer-executable instructions, such as program modules, being executed by a computer such as a personal computer, laptop computer, notebook computer, tablet computer, PDA and the like. Generally, program modules include routines, programs, characters, components, data structures, that perform particular tasks or implement particular abstract data types. As those skilled in the art will appreciate, the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring to the drawings, a Sequence OLAP system (S-OLAP) system 50 is provided. The S-OLAP system 50 analyzes sequence data and has many applications, for example, a transportation planning application. Today, many cities have implemented electronic transportation payment systems using RFID technology. Examples include Hong Kong's Octopus system, Japan's Kansai Thru Pass system and Washington DC's SmarTrip system. In these cities, every passenger carries a smart card, for example, a card with a passive RFID chip, which is used as a form of electronic money to pay for various kinds of transportation such as bus or subway. The electronic payment system generates huge volumes of data everyday. For example, Hong Kong's Octopus system collected over seven million transactions per day in 2003. The transactions performed by a user each day can form logical sequences in many different ways. For example, a sequence is formed by clustering a user's transactions over 1-day, 1-week or 1-month periods.

With the enormous amount of sequence data available, an OLAP system that performs sequence summarizations is desirable. For example, if a transport-planning manager of Washington Metropolitan Area Transit Authority (WMATA) wants to rearrange the subway schedule, he may initiate a query asking "the number of round-trip passengers and their distributions over all origin-destination station pairs within 2007 Quarter 4". FIG. 1 presents an artificial WMATA dataset. It is assumed that a passenger registers an event/transaction into the system every time she enters (action="in") or leaves a station (action="out") through the turnstiles. Therefore, the round-trip semantics may be captured by the pattern (X,Y,Y,X), which means that all passengers who have first entered any station X (for example, Pentagon), exited at any station Y (for example, Wheaton), and then entered station Y (Wheaton) again and returned to station X (Pentagon) should be grouped together. Furthermore, for each possible combination of X and Y, the aggregated number of passengers is counted and a tabulated view of the sequence data shown in FIG. 2 should be returned by the S-OLAP system 50.

The S-OLAP system 50 also allows a user to interactively change the grouping pattern and be able to answer iterative queries efficiently. For example, after studying the round-trip distribution in FIG. 2, the manager might observe that there is a high concentration of people taking round-trips from Pentagon to Wheaton. He might want to further investigate whether those passengers would take one more follow-up trip and if so where they usually go. He can view this distribution by first performing a traditional slice OLAP operation on (Pentagon,Wheaton,Wheaton, Pentagon), followed by changing the grouping pattern to (X,Y,Y,X,X,Z), where the two newly appended symbols X,Z denote the third trip from station X (Pentagon) to any station Z.

S-OLAP systems have many more applications. Another example is a marketing manager of an e-commerce company can use an S-OLAP system to identify some "lost-sales" page-clicking sequences by posing S-OLAP queries such as: "for all possible pairs of page combinations within 2007 Quarter 4, show the number of visitors per day, with a visiting pattern of (P,K)" on its web server access log, where P denotes any product page and K denotes any "killer page" (for example, a logout page). Again, the manager can interactively change the grouping pattern and the S-OLAP system should be able to efficiently answer those iterative queries so as to help the manager to drill-down into the actual reasons for the lost-sales.

In the S-OLAP system 50, a sequence is characterized by the attributes' values of its constituting events and by the subsequence/substring patterns it possesses. The S-OLAP system 50 supports pattern-based grouping and aggregation. This is a very powerful concept and capability that is not supported by traditional OLAP systems.

The raw data of an S-OLAP system is a set of events that are deposited in an event database. An event e is modeled as an individual record/tuple in a way similar to those stored in a fact table in a traditional OLAP system. Referring to an event database 41 stores events 12 is in the form of (time, card-id, location, action, amount). It is assumed that each passenger has only one smart card. Therefore, the first event in FIG. 1 shows that a passenger with card-id 688 has entered Glenmont station (action="in") at time 00:01 on Jan. 1, 2007. Since the data is collected and consolidated from each station, it is assumed that events 12 in the event database 41 are ordered by the location and time attributes 13.

An event 12 in an S-OLAP system consists of a number of dimensions and measures and each dimension may be associated with a concept hierarchy. In FIG. 1, the attributes 13 time, card-id, location and action are dimensions and the attribute amount is a measure. In the described example, it is assumed that the location attribute is associated with a concept hierarchy of two abstraction levels station→district, the card-id attribute is associated with a concept hierarchy individual→fare-group (for example, student or regular or senior), and the time attribute is associated with a concept hierarchy time→day→week.

If there is a logical ordering among a set of events, the events can form a sequence. In the described example, a logical ordering may be based on the time attribute. Therefore, the traveling history of passenger 688 may be denoted by the sequence which consists of all the events with card-id 688, ordered by the time attribute.

Sequence Cuboid (S-Cuboid)

In S-OLAP, an S-cuboid is a logical view of sequence data at a particular degree of summarization in which sequences is characterized by the attributes' values and by the subsequence/substring patterns they possess.

Referring to FIG. 3, a cuboid specification for an example query $Q_1$ is depicted. Query $Q_1$ asks for the number of roundtrip passengers and their distributions over all origin-destination station pairs for each day and for each fare-group within Quarter 4 of 2007.

Figure 4:
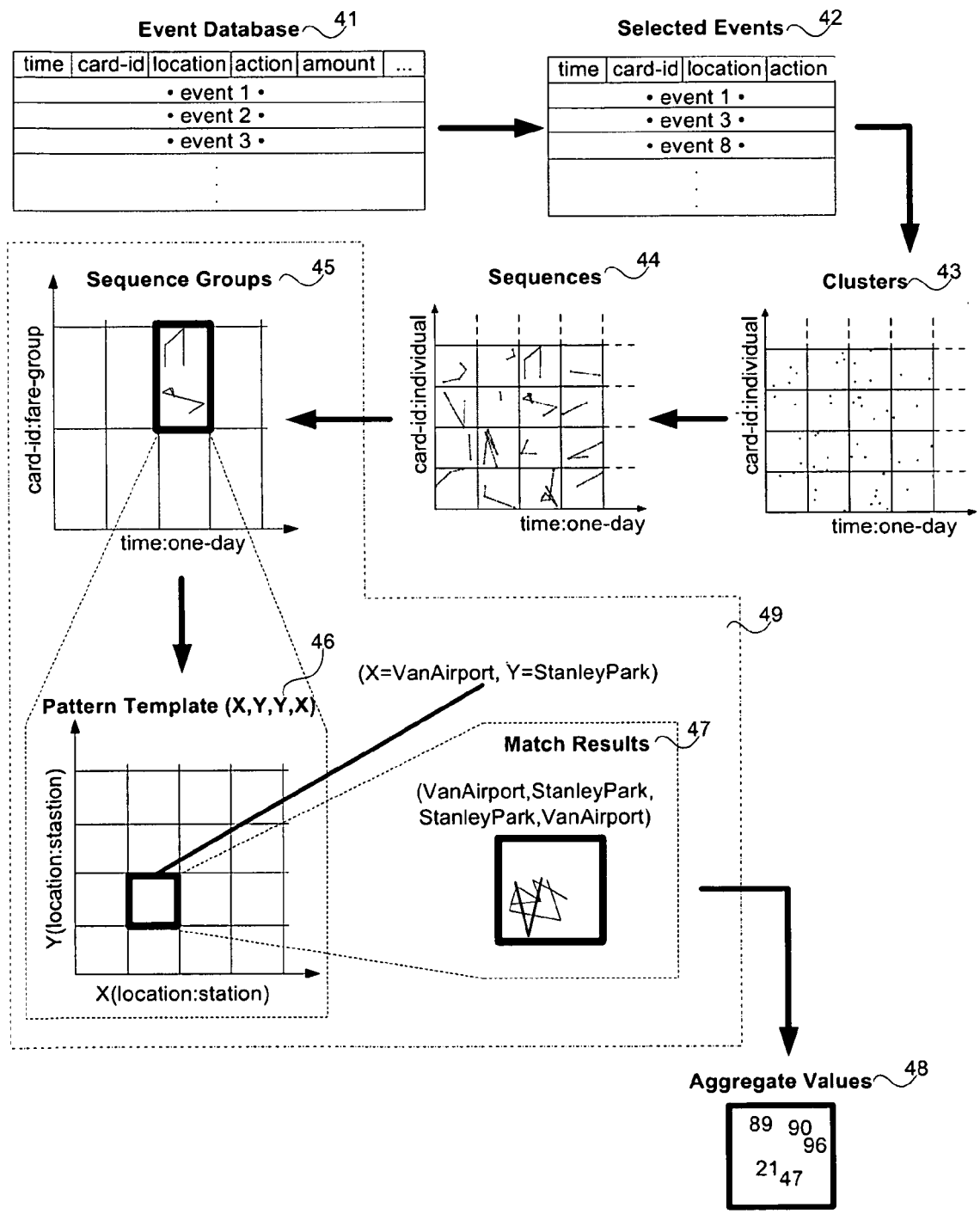
FIG. 4 is a conceptual view of building an S-cuboid for Query $Q_1$.

Referring to FIG. 4, the steps of building an S-cuboid 49 for the example query $Q_1$ are depicted. After completion of all steps, a four dimensional S-cuboid 49 with two global dimensions (time:day, card-id:faregroup) and two pattern dimensions (X,Y) are built. The event database 41 stores events 12.

Each event 12 has the following attributes: time, card-id, location and action (which are dimensions) and amount (which is a measure).

The specification of an S-cuboid 49 consists of six parts: (1) WHERE clause (2) CLUSTER BY clause, (3) SEQUENCE BY clause, (4) SEQUENCE GROUP BY clause, (5) CUBOID BY clause and (6) Aggregation Functions.

1. Selection

A WHERE clause selects only events 12 of interest. Lines 3 and 4 in FIG. 3 specify that only events 12 within 2007 Q4 are selected as the selected events 42.

2. Clustering

A CLUSTER BY clause specifies events that are elements of a sequence to be clustered together 43. Each attribute in the CLUSTER BY clause is associated with an abstraction level in a concept hierarchy. Lines 5 and 6 in FIG. 3 specify that events should be clustered together according to the attributes card-id and time, at the abstraction levels of individual and day, respectively. In other words, events that share the same card-id value and occur in the same day should form a cluster. However, events in the same cluster are not necessarily ordered at this stage.

3. Sequence Formation

A SEQUENCE BY clause forms a sequence 44 from a cluster of events 43. Events in each cluster form exactly one sequence. For example, Line 7 in FIG. 3 specifies that the clustered events 43 should form sequences 44 according to their occurrence time.

4. Sequence Grouping

A SEQUENCE GROUP BY clause is introduced such that sequences 44 whose events share the same dimensions' values are further grouped together to form a sequence group 45. The attributes in the SEQUENCE GROUP BY clause form the set of global dimensions and each of them is associated with an abstraction level in the concept hierarchy. For instance, Lines 8 and 9 in FIG. 3 specify that individual user sequences within the same fare-group and whose events occurred in the same day should form a sequence group 45. If the SEQUENCE GROUP BY clause is not specified, all sequences form a single sequence group.

5. Pattern Grouping

A CUBOID BY clause is introduced in order to specify the logical view of the sequence data that the user wants to see. The CUBOID BY clause consists of three subparts: Pattern Template, Cell Restriction and Matching Predicate. FIG. 4 illustrates pattern grouping 46 and the details are explained below.

A Pattern Template consists of a sequence of symbols, each associated with a domain of values. The domain of values is specified as the domain of an attribute at certain abstraction level. The set of distinct symbols in a pattern template form the set of pattern dimensions. The set of pattern dimensions together with the set of global dimensions define the partitioning of an S-cuboid 49 (that is, the cells of an S-cuboid).

The Pattern Template defines the format of the substring/subsequence patterns to be matched against data sequences. SUBSTRING(X,Y,Y,X) or SUBSEQUENCE(X,Y,Y,X) means a substring/subsequence pattern template (X,Y,Y,X) is specified. Lines 10 to 12 in FIG. 3 show an example substring pattern template with two pattern dimensions X and Y, each represents a location value at the station abstraction level.

Each cell is associated with a pattern. A pattern is instantiated from a pattern template by a set of values that are associated with the symbols. If two symbols in a pattern template are the same, then they should be instantiated with the same value. For example, the pattern (Pentagon, Wheaton, Wheaton, Pentagon) is an instantiation of pattern template (X,Y,Y,X) but the pattern (Pentagon,Wheaton,Glenmont, Pentagon) is not. If a data sequence matches the pattern of a particular cell, and if it further satisfies the Cell Restriction and the Matching Predicate, then it is assigned to that cell 47. Since a data sequence may match multiple patterns, it may be assigned to more than one cuboid cell.

The Cell Restriction defines how to deal with the situations when a data sequence contains multiple occurrences of a cell's pattern and what content of the data sequence should be assigned to the cell (for the purpose of aggregation, to be done later). One type of cell restriction is left-maximality-matched-go. For example, when a cell with a substring pattern (a,a) is matched against a data sequence haabaai, the left-maximality-matched-go cell restriction states that only the first matched substring/subsequence (that is, the first "aa" in haabaai) is assigned to the cell. This cell restriction is specified by the keyword LEFT-MAXIMALITY. In general, depending on the applications, more cell restrictions are defined. For example, one can define a left-maximalitydata-go cell restriction where the whole data sequence haabaai, not only the matched content haai, is assigned to the cell. As another example, an all-matched-go cell restriction is also defined where all substrings/subsequences that match the pattern are assigned to the cell (that is, the two aa's in haabaai are assigned to the cell).

A Matching Predicate is for selecting data sequences of interest. In order to specify a predicate, a sequence of event placeholders is introduced after the cell restriction. Line 13 in FIG. 3 shows an example of a Matching Predicate. The four event placeholders $x_1$, $y_1$, $y_2$ and $x_2$ in Line 13 represent the matched events (not only the location values) and the predicate in Line 14 specifies that the action attribute value of the first matching event $x_1$ must equal "in".

An aggregation function is specified in the SELECT clause in order to define the aggregate function 48 to be applied to the sequences in each S-cuboid cell 47. In S-OLAP, the COUNT aggregation function 48 counts the number of matched substrings/subsequences that are assigned to a cell 47 as illustrated in FIG. 4.

An S-cuboid specification may be further extended if necessary. For example, other aggregation functions, such as SUM, may be incorporated if its semantics is clearly defined. For example, two data sequences $s_1\langle e_1,e_2\rangle$ and $s_2\langle e_3,e_4\rangle$ are assigned to a cell. SUM is defined as the sum of the measures of all the events that occurred in $s_1$ and $s_2$ (that is, SUM=$\Sigma_{i=1}^{4}e_i$amount). Alternatively, if desired, the first occurring event is summed over in each sequence (that is, SUM=$e_1$amount+$e_3$amount). The S-cuboid specification supports substring or subsequence pattern templates. The specification may be extended so that pattern templates of regular expressions are supported.

Sequence OLAP Operations

OLAP is a powerful analytical and decision-supporting tool because it provides a set of operations (for example, roll-up or drill-down) for a user to interactively modify the cuboid specification (that is, changing the set of dimension attributes and/or their abstraction levels) and thus enables a user to navigate from one cuboid to another to explore the big cube space with ease. Since an S-cuboid is defined by a set of global dimensions and pattern dimensions, any changes to these elements transform an S-cuboid to another. In the S-OLAP design, the same set of OLAP operations are adopted, namely, roll-up, drill-down, slice, and dice for the manipulations of the global dimensions. For example, the transport-planning manager might modify the S-OLAP query $Q_1$ so that passengers are grouped based on individual. To achieve this, a drill-down operation is performed on the global dimension card-id, going from the abstraction level fare-group to a lower abstraction level individual.

For pattern manipulation, six S-OLAP operations are provided, namely, APPEND, PREPEND, DE-TAIL, DE-HEAD, PATTERN-ROLLUP (P-ROLL-UP) and PATTERN-DRILL-DOWN (P-DRILL-DOWN). These six S-OLAP operations modify the grouping patterns and/or the abstraction level of the elements inside the grouping patterns such that users can interactively view the summarized data from different perspectives. In other words, the six S-OLAP operations allow users to navigate from one S-cuboid to another in the S-cube space with ease. The first four operations add/remove a pattern symbol to/from a pattern template and the last two operations modify the abstraction level of pattern dimensions.

The APPEND operation appends a pattern symbol to the end of the pattern template. For example, after learning about the round-trip distribution resulted from query $Q_1$, the manager might observe that there is a particularly high concentration of people traveling round-trip from Pentagon to Wheaton. He might want to further investigate whether those passengers would take one more trip and if so where they usually go. Two APPEND operations plus a modification of the matching predicate give the cuboid specification $Q_2$ in FIG. 5 (only the CUBOID BY clause is shown for brevity). $Q_2$ transforms the original four dimensional S-cuboid to a five dimensional S-cuboid with global dimensions (time:day, card-id:fare-group) and pattern dimensions (X,Y,Z), where Z is a new pattern dimension. The other three operations that modify pattern length are similarly defined:

PREPEND—add a symbol to the front of the pattern template;

DE-TAIL—remove the last symbol from the pattern template; and

DE-HEAD—remove the first symbol from the pattern template.

A P-ROLL-UP operation moves the abstraction level of a pattern dimension one level up the concept hierarchy. A P-DRILL-DOWN operation moves a pattern dimension one level down. For example, after viewing the trip distribution resulting from query $Q_2$, the manager might find that there are too many station pairs which makes the distribution reported by the S-cuboid too fragmented. He may want to roll up the location pattern dimension Z from the station level to the district level. For that, the P-ROLL-UP changes Line 13 in FIG. 5 to: "Z AS location AT district".

Sequence Data Cube (S-Cube)

In S-OLAP, an S-cuboid is defined for each of the possible subsets of the given dimensions and abstraction levels for a set of global and pattern dimensions and a set of concept hierarchies that is associated with the dimensions. The set of S-cuboids also form a lattice and is called a Sequence Data Cube (S-cube). An S-cuboid at a coarser granularity is at a higher level in the lattice, which means it contains fewer global and/or pattern dimensions, or the dimensions are at a higher level of abstraction.

The number of S-cuboids in an S-cube is infinite. Theoretically, users may introduce any number of pattern dimensions into the pattern template using S-OLAP operations such as APPEND and PREPEND. For example, a pattern template (X,Y,Z,A,B,C, . . . ) is possible in which all pattern dimensions refer to the same dimension attribute, say, location. Consequently, an S-cube includes an infinite number of S-cuboids although users seldom initiate S-OLAP queries with long pattern template in practice.

Generally, data in an S-cuboid is non-summarizable which means an S-cuboid at a higher level of abstraction (coarser aggregates) cannot be computed solely from a set of S-cuboids that are at a lower level of abstraction (finer aggregates) without accessing the base data. Traditionally, summarizability only holds when the data is disjoint and complete during data partitioning. However, an S-cuboid may put a data sequence into multiple cells which violates the disjointness requirement. Consider a dataset with only one data sequence $s_3$ <Pentagon,Wheaton,Pentagon,Wheaton,Glenmont>. If the pattern template is SUBSTRING(X,Y,Z), then $s_3$ contributes a count of one to all three cells [Pentagon, Wheaton,Pentagon: $c_1$], [Wheaton,Pentagon,Wheaton: $c_2$], and [Pentagon,Wheaton,Glenmont: $c_3$] because $s_3$ matches all three substrings ($c_1$, $c_2$ and $c_3$ denote the counts of the cells). If a DE-TAIL operation is performed, that is, the pattern template is changed to SUBSTRING(X,Y), then the cell [Pentagon,Wheaton: $c_4$] should have a count of one (as $s_3$ matches the pattern only once under the left-maximality-matched-go cell restriction). However, if $c_4$ is computed by aggregation, $c_4=c_1+c_3=2$, which is an incorrect answer. This generally demonstrates that data in an S-cuboid is non-summarizable.

The properties of having an infinite number of S-cuboids and non-summarizability make the implementation of an S-OLAP system very challenging. The main reason is that many existing OLAP optimization techniques (for example, full cube materialization) are no longer applicable nor useful in implementing an S-OLAP system.

S-OLAP System

To implement an S-OLAP system an S-cuboid must be efficiently computed. The S-OLAP operations are supported such that a sequence of S-OLAP queries is efficiently evaluated. In S-OLAP, full materialization is not practical because the number of pattern dimensions is unbounded. Also, the non-summarizability of S-cubes invalidates the power of partial materialization because an S-cuboid cannot be computed from other S-cuboids via simple aggregations. As a result, instead of precomputing S-cuboids, the approach is to precompute some other auxiliary data structures so that queries are computed online using the pre-built data structures.

Figure 6:
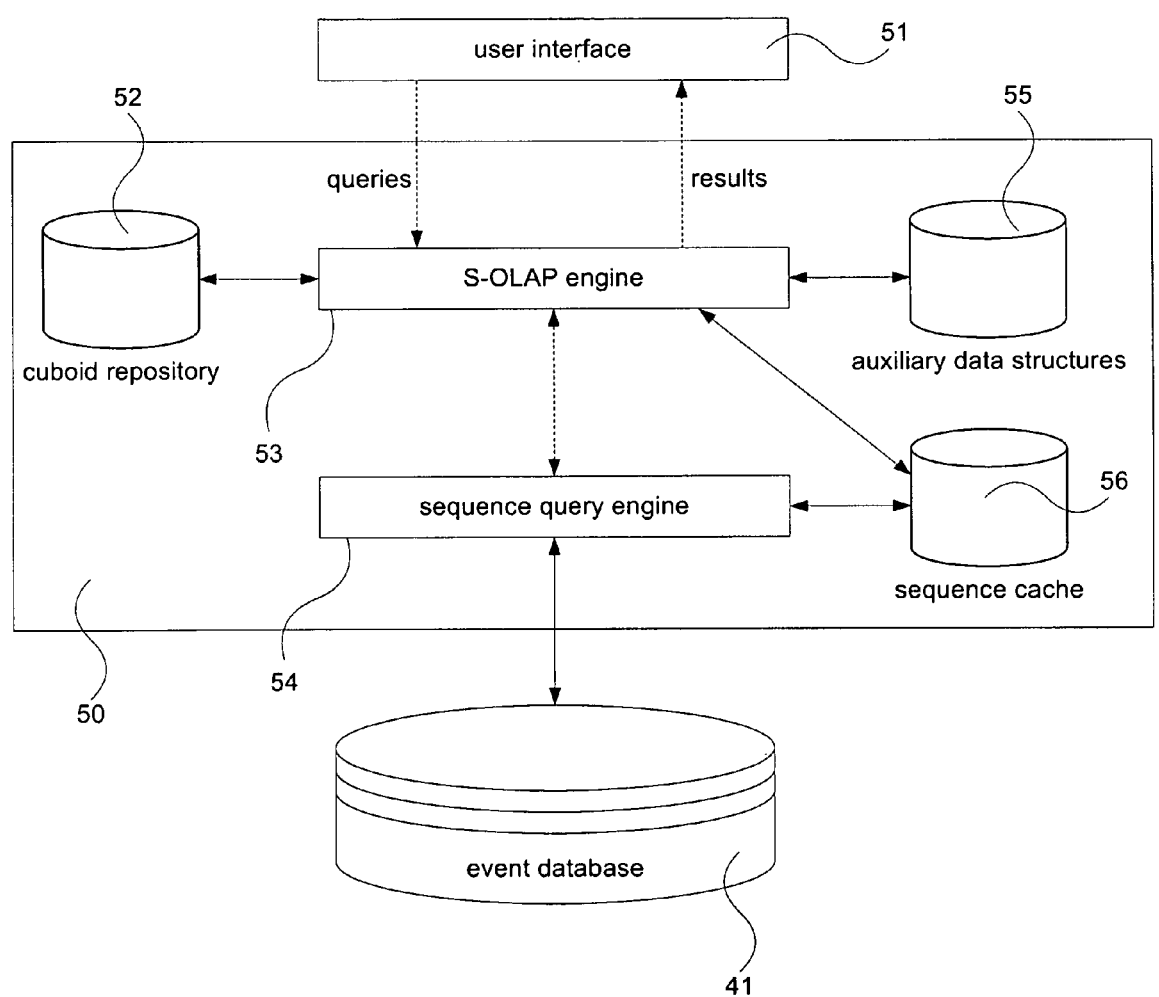
FIG. 6 is a system architecture diagram of an S-OLAP system.

Referring to FIG. 6, the architecture of the S-OLAP system 50 is depicted. Events are stored as tuples in relational databases or as events in native sequence databases 41. A user initiates their S-OLAP queries through a User Interface 51. The User Interface 51 provides user-friendly components to help a user specify an S-cuboid. These include offering some drag-and-drop facilities and a graphical user interface. Furthermore, a user can perform the six S-OLAP operations through the interface 51. An S-OLAP Engine 53 searches a Cuboid Repository 52 for an S-cuboid query to see if such an S-cuboid has been previously computed and stored. If not, the S-OLAP engine 53 either computes the S-cuboid from scratch or computes the S-cuboid with the help of certain auxiliary data structures 55. The computed S-cuboid is then added to the Cuboid Repository 52. If storage space is limited, the Cuboid Repository 52 may be implemented as a cache with an appropriate replacement policy such as LRU (least-recently-used).

During the computation of an S-cuboid, the S-OLAP System 50 starts with the first four steps of S-cuboid formation, that is, (1) Selection, (2) Clustering, (3) Sequence Formation and (4) Sequence Grouping. These four steps are offloaded to an existing sequence database query engine 54 and the constructed sequence groups are cached in a Sequence Cache 56 for efficiency. After the first four steps, the sequence groups are stored in a q-dimensional array (where q is the number of global dimensions). Once the sequence groups are formed or loaded from the sequence cache 56, the S-OLAP Engine 53 commences S-cuboid construction.

S-Cuboid Construction

Two exemplary approaches are described for S-cuboid construction. The first one is a counter-based method (CB) and the second one uses inverted indices (II) as the auxiliary data structure. It is assumed that the left-maximality-matched-go cell restriction is used.

For the counter-based method (CB), each cell in an S-cuboid is associated with a counter. All relevant counters are looked-up and incremented when the data sequences are scanned. If the number of counters is small enough to fit in memory, it is an efficient single pass algorithm. To determine the value of the counter, the set of sequences in each sequence group is scanned. For each sequence s, the cells whose associated patterns are contained in s are determined. Each of such counters is incremented by 1. The CB approach addresses efficient S-cuboid computation. For efficient processing of S-OLAP operations, CB takes the result of applying each S-OLAP operation as a specification of a new S-cuboid and computes the S-cuboid from scratch.

For each sequence group that is obtained from the first four S-cuboid formation steps performed by the sequence query engine 54, the procedure CounterBased is invoked as depicted in FIG. 7 with all sequences in the group and the CUBOID BY specification as input. The procedure performs the pattern grouping step and the aggregation step and returns an n-dimensional array where n is the number of pattern dimensions. An entry $C[v_1, \ldots, v_n]$ in the n-dimensional array C stores the number of sequences that match the substring pattern $(v_1, \ldots, v_n)$.

The procedure repeats for each sequence group and finally a (q+n)-dimensional S-cuboid is obtained.

The CounterBased procedure in FIG. 7 is for substring pattern matching only. Subsequence pattern are supported by modifying Line 7 in FIG. 7. The performance of the counter-based method may degrade when the number of counters far exceeds the amount of available memory because counters are paged in for each sequence in the scan. Furthermore, this algorithm does not facilitate the processing of iterative S-OLAP queries as it computes an S-cuboid from scratch every time an S-OLAP operation is applied to transform an S-cuboid.

For inverted indices (II), a set of inverted indices is created by pre-processing the data offline. During query processing, the relevant inverted indices are joined online so as to address efficient S-cuboid computation. The by-products of answering a query are the creation of new inverted indices. Such indices can assist the processing of a follow-up query. The inverted list approach thus potentially addresses efficient processing of S-OLAP operations as well.

The inverted index approach involves two basic algorithms: one for computing inverted indices and one for constructing S-cuboids based on the inverted indices. The pattern dimensions are partitioned into a set of low dimensional pattern fragments and each fragment is represented by an inverted index. Using the precomputed inverted indices, the S-cuboid cells of the required S-cuboid online are dynamically assembled and computed.

The inverted index approach shares the same first four steps of S-cuboid formation as in the counter-based approach. After the first four steps, a number of sequence groups are formed. To illustrate the inverted index approach, substring patterns and the sequence group shown in FIG. 8 are considered. It is assumed each sequence is identified by a unique sid attribute.

BuildIndex is a construction algorithm to precompute inverted indices. BuildIndex creates a size-m inverted index $L_m$, where m is a user-specified parameter. $L_m$ is a set of inverted lists. An inverted list, denoted by $L_m[v_1, \ldots, v_m]$, is associated with a length-m substring pattern $(v_1, \ldots, v_m)$. Each element in the pattern is chosen from the domain of a pattern dimension at a particular abstraction level. The list stores the sids of all sequences that match the substring patterns associated with it. For example, considering the location pattern dimension at the station abstraction level, two inverted indices $L_1$ and $L_2$ constructed for the data sequence group are shown in FIG. 10 (empty lists, such as $L_2$[Clarendon,Clarendon], are not shown). For notational convenience, a pattern template T, $L_m^T$ is used to denote a subset of $L_m$ such that an inverted list $L_m[v_1, \ldots, v_m]$ is in $L_m^T$ if the pattern $(v_1, \ldots, v_m)$ is an instantiation of the template T (for example, considering the lists in FIG. 10, $L_2^{(X,X)} = \{I_5, I_9\}$). Also $L_2^{(X,Y)}$ includes all the lists in $L_2$ if there are no restrictions on X and Y. BuildIndex is summarized in FIG. 9.

Given a set of precomputed inverted indices, computing an S-cuboid is not difficult. Consider a query $Q_3$ that inquires the statistics of single-trip passengers. The cuboid specification of $Q_3$ is shown in FIG. 11 (only the CUBOID BY clause is shown). $Q_3$, which specifies a pattern template (X,Y), is answered by $L_2^{(X,Y)}$ (which is the same as $L_2$ since X, Y are unrestricted). For each instantiation $(v_1, v_2)$ of (X,Y), the count of the S-cuboid cell of pattern $(v_1, v_2)$ is computed by simply retrieving the inverted list $L_2[v_1, v_2]$, and counting the number of sequences in the list that satisfy the cell restriction and predicate (that is, Lines 13-15 in FIG. 11). FIG. 12 shows the non-zero entries of the 2D S-cuboid computed. S-cuboids of higher dimension can also be computed by joining inverted indices. For example, consider query $Q_1$, which specifies a pattern template (X,Y,Y,X). $Q_1$ is answered in two steps, assuming that $L_2$ is materialized. $L_3^{(X,Y,Y)}$ is first computed (that is, the set of inverted lists for any length-3 patterns that are instantiations of (X,Y,Y)). This is done by joining $L_2^{(X,Y)}$ with $L_2^{(Y,Y)}$. The semantics of $R = L_2^{(X,Y)} \bowtie L_2^{(Y,Y)}$ is that a list $l \in R$ iff $l = L_2[v_1, v_2] \cap L_2[v_3, v_3]$ such that $L_2[v_1, v_2] \in L_2^{(X,Y)}$, $L_2[v_3, v_3] \in L_2^{(Y,Y)}$ and $v_2 = v_3$. Using the described example, $L_2^{(X,Y)} = L_2$ and $L_2^{(Y,Y)} = \{I_5, I_9\}$. The list intersections performed by the join is illustrated in FIG. 13. Sequences in the lists in R are then checked by scanning the database to eliminate invalid entries. For example, refer to FIG. 13, list $I_{12}$ is obtained by $I_5 \cap I_5 = \{s_1\}$. Since $s_1$ does not contain the substring pattern (Pentagon, Pentagon, Pentagon), $s_1$ is removed from the list. The resulting index gives $L_3^{(X,Y,Y)}$. The index $L_4^{(X,Y,Y,X)}$ is obtained by joining $L_3^{(X,Y,Y)}$ with $L_2^{(Y,X)}$ in a similar fashion. FIG. 14 shows the only non-empty list resulted. Finally, the count of an S-cuboid cell is computed by retrieving the corresponding list in $L_4^{(X,Y,Y,X)}$, verifying the sequences against cell restrictions and predicates, and counting the valid ones. In the example, only one cell [Pentagon, Wheaton,Wheaton,Pentagon] has a count of 1, all others are 0.

The query processing algorithm QueryIndices is summarized in FIG. 15. For all S-OLAP queries, QueryIndices is invoked to compute an S-cuboid from scratch. During query evaluation, if QueryIndices requires an inverted index that is not available, then QueryIndices would build the proper inverted index at runtime. This on-demand building process would increase the initial query time. However, the subsequent iterative queries, which are obtained by successive applications of S-OLAP operations and highly correlated to the previous queries, would be benefited from the newly computed inverted indices. The six S-OLAP operations can use of existing inverted indices to obtain better performance.

For a sequence of iterative queries, $Q_a$, $Q_b$, $Q_c$, if a query has been evaluated before and its result is cached, the evaluation is skipped and the cached result is returned immediately. For example, if an APPEND on $Q_a$ to obtain $Q_b$ is performed, followed by a DE-TAIL to obtain $Q_c$, then $Q_c$ is the same as $Q_a$ and the cached result is returned.

Referring to FIG. 11, the implementation of the APPEND operation is explained by the following iterative queries $Q_a$, $Q_b$, $Q_c$. $Q_3$ is used as $Q_a$. The second query $Q_b$ is obtained by APPENDing a symbol Y to $Q_a$ and therefore its pattern template is (X,Y,Y). The final query $Q_c$ is obtained by APPENDing one more symbol X to $Q_b$. The first query $Q_a$ is directly evaluated by QueryIndices. That is, the inverted index $L_2^{(X,Y)}$ in FIG. 10 is scanned and the number of sequences that satisfy the cell restriction and matching predicate in each list is counted. The result of $Q_a$ is shown in FIG. 12. The implementation of an APPEND operation is very similar to QueryIndices. In the example, the first APPEND operation (that is, the evaluation of $Q_b$) is implemented by first performing $L_2^{(X,Y)} \bowtie L_2^{(Y,Y)}$ to obtain $L_3^{(X,Y,Y)}$ and then counting the number of sequences in $L_3^{(X,Y,Y)}$ (FIG. 13) that satisfy the cell restriction and the matching predicate. Similarly, the last APPEND operation (that is, the evaluation of $Q_c$) is implemented by first joining $L_3^{(X,Y,Y)}$ with $L_2^{(Y,X)}$ to obtain $L_4^{(X,Y,Y,X)}$, and then counting the number of sequences in $L_4^{(X,Y,Y,X)}$ (FIG. 14) that satisfy the cell restriction and the matching predicate. The last APPEND operation does not build the inverted index $L_4^{(X,Y,Y,X)}$ from scratch.

The PREPEND operation is very similar to the APPEND operation. Continue with the above iterative queries example. Assume that there is a further PREPEND a symbol Z to $Q_c$ to obtain a new query Qd and the resulting pattern template is (Z,X,Y,Y,X). Similar to the APPEND operation, this PREPEND operation is implemented by joining $L_2^{(Z,X)}$ with $L_4^{(X,Y,Y,X)}$ to obtain $L_5^{(Z,X,Y,Y,X)}$. With $L_4^{(X,Y,Y,X)}$ computed, the domain (that is, the set of all possible instantiations) of X is known. Therefore, $L_2^{(Z,X)}$ does not contain all lists in $L_2$, as X is restricted.

The DE-HEAD and the DE-TAIL operations rely more on the caching feature of the S-OLAP system. Continue with the above iterative queries example. If a DE-HEAD operation is applied after the evaluation of Qd, the query back to $Q_c$ is essentially restored. Therefore, the system can return the cached S-cuboid of $Q_c$ as the answer. However, another DEHEAD operation results in a new query $Q_e$ with pattern template (Y,Y,X). Since the inverted index $L_3^{(Y,Y,X)}$ has not been built during the process (see the table on the next page), $Q_e$ is evaluated from scratch, by invoking QueryIndices directly.

| Query | Pattern Template |
|---|---|
| $Q_a$ | (X, Y) |
| $Q_b$ | (X, Y, Y) |
| $Q_c$ | (X, Y, Y, X) |
| $Q_d$ | (Z, X, Y, Y, X) |
| $Q_e$ | (Y, Y, X) |

The DE-TAIL operation is similar to the DE-HEAD operation. If there are proper inverted indices available or the query has been evaluated before, the DE-TAIL operation may be processed by retrieving a cached result. Otherwise, QueryIndices is invoked.

The P-ROLL-UP operation is efficiently implemented if there are proper inverted indices available. Assume a P-ROLL-UP operation is applied on $Q_a$ such that the pattern dimension Y on the location attribute of the new query $Q_a$ is rolled up from the station abstraction level to the district abstraction level. This P-ROLL-UP operation is efficiently implemented by taking the unions of the lists in $L_2^{(X,Y)}$ whose second elements in their patterns share the same district value. The resulting inverted index is denoted $L_2^{(X,\bar{Y})}$. For example, assume that district D10 includes two stations Pentagon and Clarendon, then the lists $L_2^{(X,Y)}$ [Wheaton,Clarendon] and $L_2^{(X,Y)}$ [Wheaton,Pentagon] (see $I_7$ and $I_8$ in FIG. 10) are unioned to obtain $L_2^{(X,\bar{Y})}$ [Wheaton,D10]. The result of applying a P-ROLL-UP can then be obtained by counting the number sequences in $L_2^{(X,\bar{Y})}$ that satisfy the cell restriction and matching predicate. For instance, the cell [Wheaton,D10] in the resulting S-cuboid has a count of three. In the above example, symbols in the pattern template (X,Y) are unrestricted. If symbols are restricted then a P-ROLL-UP may not be processed by simply merging lists. To understand why it is so, let us consider a sequence $s_6$:

<Pentagon,Wheaton,Wheaton,Clarendon>. Clearly, $s_6$ does not occur in any list of $L_4^{(X,Y,Y,X)}$. However, district D10 includes both Pentagon and Clarendon and so $s_6$ should be in $M=L_4^{(X,Y,Y,X)}$ [D10, Wheaton, Wheaton, D10]. Hence, if M is computed by merging lists in $L_4^{(X,Y,Y,X)}$, $s_6$ will be missed incorrectly. This example shows that if the pattern template consists of restricted symbols, P-ROLL-UP cannot be implemented by merging inverted lists at a lower abstraction level. In this case, the result is computed by invoking QueryIndices.

P-DRILL-DOWN may be applied on $Q_a$ (that is, the pattern dimension Y of $Q_3$ has been rolled-up). If the inverted index $L_2^{(X,Y)}$ for $Q_a$ is available, the cached result is returned. Otherwise, P-DRILL-DOWN is processed either by invoking QueryIndices or by constructing the inverted index $L_2^{(X,Y)}$ from $L_2^{(X,\bar{Y})}$. For the latter case, each list $L_2[v_1,v_2]$ in $L_2^{(X,\bar{Y})}$ is refined into a number of lists $L_2[v_1, v_2]$ where $v_2$ is a lower-level concept of $v_2$. Data sequences are examined to determine the refinement. For example, $L_2^{(X,\bar{Y})}$ [Wheaton,D10]= $\{s_1, s_2, s_4\}$. It is refined to $L_2$[Wheaton,Pentagon]=$\{s_1, s_2\}$ and $L_2$[Wheaton,Clarendon]=$\{s_4\}$.

These two approaches are only two first-attempt solutions to the S-OLAP problem and there is a lot of potential for further optimization. For example, it is possible to study the problem of computing iceberg S-cuboids, or online aggregation of S-cuboids, etc.

The counter-based approach (CB) constructs an S-cuboid by scanning data sequences to determine which cells each sequence is relevant to. All sequences are thus examined in answering a S-OLAP query. On the other hand, the inverted list approach (II) constructs inverted lists and accesses data sequences that are contained in certain lists. In terms of performance, II has the advantage of fewer data sequence accesses if queries are very selective, for example, point queries or subcube queries, where appropriate lists have already been constructed. This is seen from the example iterative queries. On the other hand, the construction of inverted indices is costly. This affects the performance of II, particularly in the start-up cost of iterative queries.

The inverted index approach is not always the preferred way for implementing all S-OLAP operations. For example, it cannot efficiently support P-ROLL-UP if the pattern template contains restricted symbols. In these cases, CB is an attractive alternative. Many factors such as storage space, memory availability, and execution speed are parts of the formula may affect S-OLAP query optimization. Also, the choice of which inverted indices should be materialized offline must be addressed. A related issue is how to determine the lists to be built given a set of frequently asked queries. All these issues are related to the design of an S-OLAP query optimizer and is regarded as important.

The results of the experiments conducted on the S-OLAP system are described. In an exemplary embodiment, the system was implemented using C++ and all the experiments were conducted on an Intel Pentium-4 2.6 GHz personal computer with 2 Gb of RAM. The system ran Linux with the 2.6.10 kernel and gcc 3.3.3.

Experiments were performed on both real data and synthetic data. The experiments on real data show a use case of performing click stream data analysis using the S-OLAP system. The experiments on synthetic data study the performance of the S-OLAP system and evaluate the CounterBased and the inverted index approaches.

Experiments on Real Data

The real sequence data is a clickstream and purchase dataset from Gazelle.com, a legwear and legcare web retailer, who closed their online store on 2000-08-18. It was prepared for KDD Cup 2000. The original data file size is 238.9 MB. Each tuple in the data file is a visitor click event (sorted by user sessions) and there is a total of 164,364 click events. The details of an event are captured by 215 attributes. Three example attributes are session-id, request-time and page which identify a user session, its first access time, and the accessed page.9

To demonstrate the usability of the S-OLAP system and to validate the S-OLAP design, the S-OLAP system is used to answer a KDD Cup 2000 data mining query in an OLAP data exploratory way. The selected query is KDD Cup 2000 Query 1, which looks for page-click patterns of visitors. Since the data was not designed for OLAP analysis, the following pre-processing steps are performed:

(1) The data was manually inspected and filtered out click sequences that were generated from web crawlers (that is, user sessions with thousands of clicks). After this step, an event database with 148,924 click events was obtained.

(2) A concept hierarchy raw-page→page-category is manually associated to the page attribute such that a page is categorized by two abstraction levels. page-category is a higher abstraction level and there are 44 categories. Example categories include "Assortment", "Legwear", "Legcare", "Main Pages", etc.

To answer the KDD Cup query, a general S-OLAP query $Q_a$ is started to look for information about any two-step page accesses at the page-category abstraction level:

| | |
|---|---|
| 1. SELECT | COUNT(*) FROM Event |
| 2. CLUSTER BY | session-id |
| 3. SEQUENCE BY | request-time ASCENDING |
| 4. CUBOID BY | SUBSTRING(X, Y) WITH |
| 5. | X AS page AT page-category, |
| 6. | Y AS page AT page-category |
| 7. | LEFT-MAXIMALITY($x_1,y_1$) |

There were 50,524 sequences constructed and they were in a single sequence group. Query $Q_a$ returned a 44×44 2D S-cuboid. From the result, it was found that the cell (Assortment, Legcare) had a count of 150, meaning that there were 150 sessions first visited an Assortment-related page followed by a Legcare-related page. Interestingly, it was found that the cell (Assortment, Legwear) had a much larger count of 2,201 sequences (the highest count in the S-cuboid), meaning that there were many sessions first visited an Assortment-related page followed by a Legware-related page. Consequently, a slice operation was performed on that cell (that is, Assortment→Legwear) and performed a P-DRILL-DOWN operation to see what Legwear products the visitors actually wanted to browse. This results in a new query $Q_b$ (the cuboid specification is omitted due to lack of space).

Query $Q_b$ returned a 1×279 2D S-cuboid. The cell with the highest count was (Assortment, product-id-null) which had a count of 181, meaning that many sessions visited a product page where the product has no product-id after clicking an Assortment-related page. Another remarkable cell was (Assortment, product-id-34893) which had a count of 172 (the second highest count), meaning that there were many sessions first visited an Assortment-related page followed by a DKNY Skin collection legwear page (product-id=34893). After viewing the result of $Q_b$, an APPEND operation was performed to see if those sessions who visited an Assortmentrelated page followed by a Legware-related page would visit one more Legware-related page to perform so-called "comparison shopping". That APPEND operation resulted in a new query $Q_c$.

Query $Q_c$ returned a 1×279×279 3D S-cuboid. A remarkable cell was (Assortment,product-id-34885, product-id-34897) which had a count of 14, meaning that there were 14 sessions visited an Assortmentrelated page, then a DKNY Skin collection legwear page (product-id=34885), and then a DKNY Tanga collection legware page (product-id=34897). At that point, the S-OLAP exploration was stopped because enough information was collected to answer Query 1 in KDD Cup 2000 indirectly. Altogether, the three queries had inserted 0.3 MB of cuboids in the cuboid repository.

The performances of iterative queries $Q_a$, $Q_b$, and $Q_c$ are reported using both the counter-based approach (CB) and the inverted index approach (II). Each query was repeated many times in order that the 90% confidence intervals of the reported numbers are within ±5%. No inverted index was precomputed in advance. Table 1 shows the result.

TABLE 1

| Query | Counter-Based (CB) | | Inverted Index (II) | |
|---|---|---|---|---|
| | Runtime (ms) | Number of sequences scanned | Runtime (ms) | Number of sequences scanned |
| $Q_a$ | 24.3 | 50,524 | 46.24 | 50,524 |
| $Q_b$ | 21.5 | 50,524 | 6.26 | 2,201 |
| $Q_c$ | 23.0 | 50,524 | 5.92 | 842 |
| Σ | 68.8 | 151,572 | 58.42 | 53,567 |

Table 1 shows that for the first query $Q_a$, CB achieved a better performance than II. This is not surprising because there was precomputing of any inverted index in advance so that the query processing time of $Q_a$ included the time for building 0.897 MB inverted indices. However, for $Q_b$ and $Q_c$, II outperformed CB because II did not need to scan all sequences with the help of the inverted indices. Table 1 also shows the advantage of using inverted indices to perform S-OLAP operations. From $Q_a$ to $Q_b$, a slice and a P-DRILL-DOWN operation was performed. After the slice operation, the number of sequences related to $Q_b$ was reduced. As a result, the II implementation of the P-DRILL-DOWN operation outperformed the CB implementation because $Q_b$ became more selective. From $Q_b$ to $Q_c$, an APPEND operation was performed. Table 1 shows that the II implementation of the APPEND operation also outperformed the CB implementation because II reused the inverted indices to scan fewer sequences than CB.

Experiments on Synthetic Data

Synthetic sequence databases are synthesized in the following manner. The generator takes four parameters: L, I, θ, and D. The generated sequence database has D sequences. Each sequence s in a dataset is generated independently. Its length I, with mean L, is first determined by a random variable following a Poisson distribution. Then, events were repeatedly added to the sequence until the target length I is reached. The first event symbol is randomly selected according to a pre-determined distribution following Zipf's law with parameter I and θ (I is the number of possible symbols and θ is the skew factor). Subsequent events are generated one after the other using a Markov chain of degree 1. The conditional probabilities are pre-determined and are skewed according to Zipf's law. All the generated sequences form a single sequence group and that is served as the input data to the algorithms.

QuerySet A—(a) Varying D. The objective of this experiment is to study the scalability of the counter-based approach and the inverted index approach under a series of APPEND operations. In this experiment, a set of iterative queries were executed under different numbers of sequences. The query set, namely $Q_A$, consists of five S-OLAP queries $Q_{A1}$, $Q_{A2}$, $Q_{A3}$, $Q_{A4}$ and $Q_{A5}$. A query is obtained from a previous one by doing a slice followed by an APPEND. The initial query $Q_{A1}$ has a substring pattern template (X,Y) and it looks for size-two patterns in the sequence dataset and counts their occurrences. The second query $Q_{A2}$ is obtained from $Q_{A1}$ by performing a slice operation on the cell with the highest count and APPENDing a new pattern symbol Z to the pattern template of $Q_{A1}$. Therefore, $Q_{A2}$ has a substring pattern template (X,Y,Z) and it looks for size-three patterns (with the first two symbols fixed) in the sequence dataset and counts their occurrences. Query $Q_{A3}$, $Q_{A4}$ and $Q_{A5}$ are obtained in a similar way and they are queries that look for size-four, size-five and size-six patterns in the sequence dataset, respectively.

Figure 16:
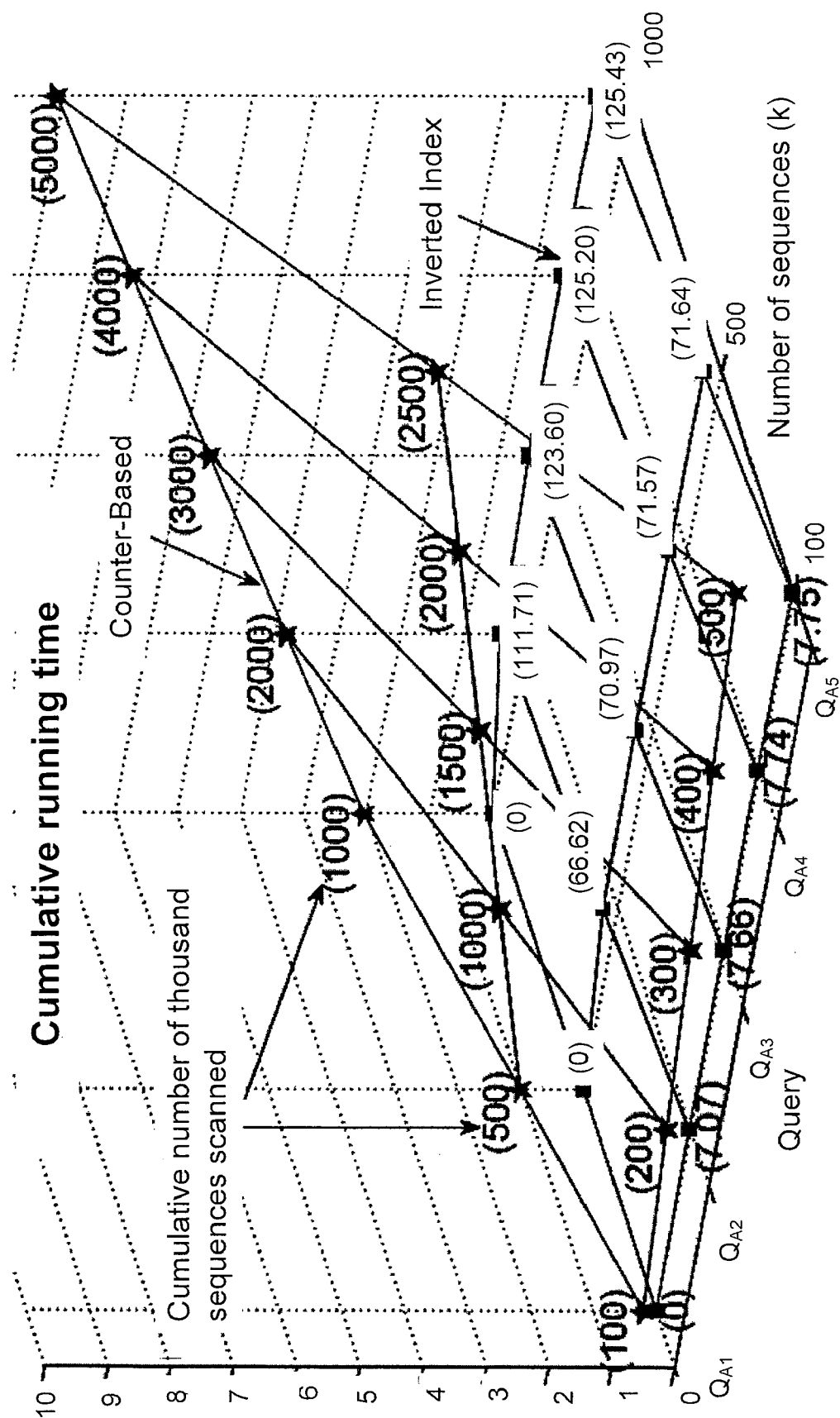
FIG. 16 is a diagram showing the running time of query set $Q_A$ under three different datasets with different number of sequences.

FIG. 16 shows the running time of query set $Q_A$ under three datasets with different number of sequences (I100.L20.θ0.9.$D_x$, where x=100K/500K/1000K). Three size-two inverted indices at the finest level of abstraction were precomputed for the three datasets. The precomputations took 0.43 s, 2.052 s and 3.879 s, respectively. The sizes of the built indices were 7.3 MB, 36.3 MB and 72.2 MB, respectively. The running time of $Q_A$ is presented as the cumulative running time from the first query $Q_{A1}$ to the last query $Q_{A5}$. From the figure, (1) both CB and II scaled linearly with respect to the number of sequences; and (2) II outperformed CB in all datasets in this experiment. In FIG. 16, each data point is annotated with a bracketed number, which is the cumulative number of sequences scanned up to a certain query. CB scanned the whole dataset every time it executed. For $Q_{A1}$, II did not scan the dataset because it may be answered by the inverted indices directly. For the successive queries $Q_{A2}$ to $Q_{A5}$ $Q_A$, II took less than 1 second to finish inverted index joins in all cases because $Q_{Ai}+1$ may exploit the inverted indices built by $Q_{Ai}$ and thus not many data sequences were scanned.

The following is a summary of other experimental results.

QuerySet A—(b) Varying L. In this experiment, query set $Q_A$ was executed on a dataset of 500K sequences and the average length L of the sequences (that is, I100.Lx.θ0.9.D500K) was varied. The following conclusions are drawn from the results: (1) both CB and II scaled linearly with respect to the average sequence length and (2) II outperformed CB in all datasets in this experiment.

QuerySet B—(a) Varying D (b) Varying L. The objective of this experiment is to study the performance of CB and II under the P-ROLL-UP and P-DRILL-DOWN operations. In this experiment, the dataset was 1100.Lx. θ0.9.D$_y$. The events were hierarchically organized into 3 concept levels. The 100 event symbols are divided into 20 groups, with group sizes following Zipf's law (I=20, θ=0.9). Similarly, the 20 groups are divided into 5 super-groups, with super-group sizes following Zipf's law (I=5, θ=0.9).

Another query set $Q_B$ was used in this experiment. $Q_B$ consists of three queries $Q_{B1}$, $Q_{B2}$, and $Q_{B3}$. The first query $Q_{B1}$ has a substring pattern templates of (X,Y,Z) (X is the middle abstraction level). The second query $Q_{B2}$ is obtained from $Q_{B1}$ by performing a subcube operation to select the subcube with the same X value where its total count is the highest among different subcubes and then P-DRILL-DOWN into X, that is, the pattern template is (X,Y,Z) (X is the finest abstraction level). Similarly, the third query $Q_{B3}$ is obtained from $Q_{B1}$ by performing the same subcube operation and then P-ROLL-UP on Y, that is, the pattern template is (X,Y,Z) (there was no P-ROLL-UP on X because it was sliced; Y is the highest abstraction level).

Similar to the experiments conducted in query set A (see above), $Q_B$ was executed on datasets with different D and L values. In this experiment, an inverted index $L_3^{(X,Y,Z)}$ was precomputed in advance. The experimental results draw the following conclusions:

(1) For P-DRILL-DOWN (that is, $Q_{B2}$), CB and II achieved comparable performance because the subcube was sliced on with the highest count and the query was not selective. Therefore, II also needed to scan a lot of sequences in order to compute the inverted list $L^{(X,Y,Z)}$. (If cells with moderate counts were sliced on, then II outperformed CB.)

(2) For P-ROLL-UP (that is, $Q_{B3}$), II outperformed CB in all datasets because II computed the answer just by merging the inverted index without scanning the dataset but CB did scan the whole dataset.

Experiments on pattern templates with restricted symbols (QuerySet C with pattern template (X,Y,Y,X)), Varying skewness factor θ, Varying domain I, and experiments with Subsequence patterns were performed. These results are consistent with earlier results.

An S-OLAP system can be initiated for a local subway company which has deployed an RFID-based electronic payment system. Every day, the IT department of the company processes the RFID-logged transactions and generates a so-called "OD-matrix" (stands for Origin-Destination Matrix). The OD-matrix is a 2Dmatrix which reports the number of passengers traveled from one station to another within the same day (that is, representing the single trip information). The OD-matrix is then sent to various departments for different purposes. For example, the engineering department may refer to the OD-matrix in order to schedule their resources. Occasionally, the management of the company requests more sophisticated reports about the passenger distributions. For example, the management was once considered offering round-trip discounts to passengers. Consequently, they wanted to know the statistics of various passenger traveling patterns at different levels of summarizations. The example queries $Q_1$, $Q_2$, and $Q_3$ were parts of their business queries.

However, since there are no OLAP systems that are capable of performing sequence data analysis, the management has to request the IT department to write customized programs whenever they come up with some business sequence queries. Given the huge volume of data and the administrative overhead, the turnaround time is usually one to two weeks. This inefficient way of sequence data analysis severely discourages data exploration and this problem is a motivation for the present S-OLAP system.

The described S-OLAP system for the subway company has three research issues classified into different areas: (1) Performance, (2) Incremental Update, and (3) Data Integration and Privacy.

The two S-cuboid construction approaches are regarded as a starting point to more sophisticated solutions to implementing an S-OLAP system. In fact, it was realized that many S-cuboid cells are often sparsely distributed within the S-cuboid space (that is, many S-cuboid cells are empty with zero count). In such a case, introducing an iceberg condition (that is, a minimum support threshold) to filter out cells with low-support count would increase both S-OLAP performance and usability as well as reduce space. How to determine the minimum support threshold is, however, always an interesting but difficult question.

Another interesting direction is to introduce the online aggregation feature into an S-OLAP system. The online aggregation feature would allow an S-OLAP system to report "what it knows so far" instead of waiting until the S-OLAP query is fully processed. Such an approximate answer to the given query is periodically refreshed and refined as the computation continues. This online feature is especially useful for S-OLAP systems because of the non-summarizable restriction of S-cube. Moreover, an approximate query answer is often adequate for many sequence analysis queries. For example, rather than presenting the exact number of round-trip passengers in FIG. 2, approximate numbers like 200,000 for the Pentagon-Wheaton round-trip would be informative enough.

The performance is improved by exploiting some other indices. For example, if the domain of a pattern dimension is small, both the base data and the inverted indices are encoded as bitmap indices. Consequently, the intersection operation and the post-filtering step is performed much faster using the bitwise-AND operation rather than using the list-intersect operation. Furthermore, if the domain is very small, the saving in storage space may be very high.

It is necessary to provide methods to incrementally update the precomputed inverted indices. In many applications like the subway company, there is a huge amount of new data being generated every day. When a day of new transactions (events) is added to the event database, a new sequence group may be created and the corresponding inverted indices are precomputed for that day. However, that new set of transactions (events) may also invalidate the cached sequence groups and the corresponding inverted indices of the same week. As a result, Smart-card systems, in addition to paying for subway rides, may be extended to new application areas. For instance, in Hong Kong, the Octopus Card can also be used to pay for other modes of public transport, to purchase groceries at supermarkets and convenient stores, and even to pay bills at restaurants. Each month, all vendors who have joined this electronic payment network upload their transactions to a centralized server maintained by an independent company for accounting purposes. Each vendor still owns its uploaded data and the data is not accessible by the others.

However, sometimes, a few vendors may share portions of their data to perform sequence data analysis together. For example, assume that the subway company collaborates with a local bus company and offer a subway-bus-transit package with which passengers who first take the subway and then transfer to a bus would get a 20% discount off the second trip. In order to evaluate the effectiveness of that cross-vendors campaign, lots of sequence OLAP queries would be posed on the passengers traveling history. However, how to integrate the two separately-owned sequence databases (the subway passenger traveling history and the bus passenger traveling history) in order to perform such a high-level sequence data analysis (without disclosing the base data to each other) is a challenging research topic.

An S-OLAP system is built and it is able to support pattern-based grouping and aggregation, which is currently not supported by any OLAP system.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

What is claimed:

1. A sequence online analytical processing (S-OLAP) system for analysing an event database storing events, each event consisting of at least one dimension and measure, the system comprising:
    a sequence cuboid (S-cuboid) builder to build an S-cuboid, the S-cuboid defining a logical view of sequences of the events at a predetermined degree of summarization;
    wherein the S-cuboid built by the S-cuboid builder is specified by:
        a WHERE clause to select events of interest from the events stored in the database;
        a CLUSTER BY clause to specify those of the selected events of interest that are elements of respective sequences to be clustered together, thereby forming one or more clusters of events;
        a SEQUENCE BY clause to form sequences from respective clusters of events;
        a SEQUENCE GROUP BY clause to group those of the sequences whose events share a common dimension value, thereby forming one or more sequence groups;
        a CUBOID BY clause to specify the logical view of the sequences of the events, the CUBOID BY clause comprising (i) a pattern template to define a format of substring/subsequence patterns to be matched against the sequences of events, (ii) a cell restriction to define how a response and content of the sequence of events should be assigned to a cell of the S-cuboid when a sequence of events contains multiple occurrences of a cell's pattern, and (iii) a matching predicate to select sequences of interest; and
        at least one aggregation function to be applied to sequences of the events in each cell of the S-cuboid.

2. The system according to claim 1, wherein each attribute in the CLUSTER BY clause is associated with an abstraction level in a concept hierarchy.

3. The system according to claim 1, wherein the pattern template consists of a sequence of symbols each associated with a domain of values, and the domain of values is specified as a domain of an attribute at a predetermined abstraction level.

4. The system according to claim 3, wherein the pattern template instantiates a pattern for each cell of the S-cuboid based upon a set of values associated with the sequence of symbols.

5. The system according to claim 1, wherein the cell restriction is specified by a keyword.

6. The system according to claim 1, wherein the matching predicate is specified by introducing a sequence of event placeholders after the cell restriction.

7. The system according to claim 1, further comprising six S-OLAP operations:
    APPEND to add a pattern symbol after a last pattern symbol of the pattern template,
    PREPEND to add a pattern symbol before a first pattern symbol of the pattern template,
    DE-TAIL to remove the last pattern symbol from the pattern template,
    DE-HEAD to remove the first pattern symbol from the pattern template,
    PATTERN-ROLLUP (P-ROLL-UP) to modify an abstraction level of a pattern dimension by moving the abstraction level of the pattern dimension one level up in a concept hierarchy, and
    PATTERN-DRILL-DOWN (P-DRILL-DOWN) to modify the abstraction level of the pattern dimension by moving the abstraction level of the pattern dimension one level down in the concept hierarchy.

8. The system according to claim 1, wherein respective sequences are each characterized by a logical ordering among their respective events.

9. The system according to claim 1, wherein a set of S-cuboids form a lattice (S-cube) and an S-cuboid at a higher level in the lattice contains (i) fewer global and/or pattern dimensions or (ii) dimensions at a higher level of abstraction.

10. The system according to claim 1, wherein the S-cuboid is computed by associating each cell in the S-cuboid with a counter and for each sequence of events, cells whose associated patterns are contained in the sequence are determined and their corresponding counter is incremented by one.

11. The system according to claim 1, wherein the S-cuboid is computed by creating a set of inverted indices by pre-processing data offline, and the set of inverted indices are used to dynamically assemble and compute the cells of the S-cuboid.

12. A method for building a sequence cuboid (S-cuboid) for a database query of an event database, the method comprising:
    selecting events from the event database;
    clustering the selected events;
    forming sequences from the clustered events; and
    grouping the sequences into sequence groups for sequences whose events share a common dimension value, further comprising grouping patterns to specify a logical view of results from the database query according to a user defined pattern template, cell restriction and a matching predicate, wherein (i) the user defined pattern template defines a format of substring/subsequence patterns to be matched against the sequences of events, (ii) the cell restriction defines how a response and content of the sequences should be assigned to a cell when a sequence of events contains multiple occurrences of a cell's pattern, and (iii) the matching predicate is used to select sequences of interest.

13. The method according to claim 12, further comprising aggregating the results of the database query according to a selected aggregation function.

14. The method according to claim 12, further comprising returning an n-dimensional array, wherein n indicates a number of pattern dimensions.

15. A sequence online analytical processing (S-OLAP) system for analysing an event database storing events, the system comprising:
    an S-OLAP engine to compute an S-cuboid for a query on the event database; and
    a sequence query engine to form part of the S-cuboid by performing the steps of: selection, clustering, sequence formation, sequence grouping, and grouping patterns to specify a logical view of results from the query according to a user defined pattern template, cell restriction and a matching predicate, wherein (i) the user defined pattern template defines a format of substring/subsequence patterns to be matched against a sequences of events, (ii) the cell restriction defines how a response and content of the sequences should be assigned to a cell when a sequence of events contains multiple occurrences of a cell's pattern, and (iii) the matching predicate is used to select sequences of interest.

16. The system according to claim 15, further comprising a cuboid repository to store computed S-cuboids, the cuboid repository to be searched by the S-OLAP engine in response to an S-cuboid query to determine whether an S-cuboid has previously been computed.

17. The system according to claim 15, further comprising a sequence cache to cache constructed sequence groups.

18. The system according to claim 15, further comprising auxiliary data structures to compute the query online.

19. The system according to claim 15, further comprising a user interface to assist a user in specifying the S-cuboid.

* * * * *